United States Patent
Mueller et al.

(10) Patent No.: US 11,556,531 B2
(45) Date of Patent: Jan. 17, 2023

(54) CRUX DETECTION IN SEARCH DEFINITIONS

(71) Applicant: SAP SE, Walldorf (DE)

(72) Inventors: Thomas Mueller, Wiesloch (DE); Joerg Meyer, Ludwigsburg (DE)

(73) Assignee: SAP SE, Walldorf (DE)

( * ) Notice: Subject to any disclaimer, the term of this patent is extended or adjusted under 35 U.S.C. 154(b) by 142 days.

(21) Appl. No.: 16/671,054

(22) Filed: Oct. 31, 2019

(65) Prior Publication Data
US 2021/0133191 A1    May 6, 2021

(51) Int. Cl.
*G06F 16/2453*    (2019.01)
*G06F 16/901*    (2019.01)

(52) U.S. Cl.
CPC .... *G06F 16/24535* (2019.01); *G06F 16/9024* (2019.01); *G06F 16/9027* (2019.01)

(58) Field of Classification Search
CPC .......... G06F 16/24535; G06F 16/9027; G06F 16/9024; G06F 16/2453
See application file for complete search history.

(56) References Cited

U.S. PATENT DOCUMENTS

| | | | |
|---|---|---|---|
| 6,775,662 B1 * | 8/2004 | Witkowski | ........ G06F 16/24537 |
| 7,506,145 B2 | 3/2009 | Zenz et al. | |
| 7,797,522 B2 | 9/2010 | Zenz et al. | |
| 7,810,067 B2 | 10/2010 | Kaelicke et al. | |
| 7,870,538 B2 | 1/2011 | Zenz et al. | |
| 8,396,795 B2 | 3/2013 | Mueller et al. | |
| 8,458,189 B1 | 6/2013 | Ludwig et al. | |
| 8,756,273 B2 | 6/2014 | Buchmann et al. | |
| 8,849,894 B2 | 9/2014 | Mueller et al. | |
| 8,978,010 B1 * | 3/2015 | Thumfart | ................. G06F 8/36 |
| | | | 717/123 |
| 9,031,976 B2 | 5/2015 | Seufert et al. | |
| 9,645,845 B2 | 5/2017 | Marwinski et al. | |

(Continued)

OTHER PUBLICATIONS

Wang et al., "Dependency tree-based SRL with proper pruning and extensive feature engineering" CoNLL '08: Proceedings of the Twelfth Conference on Computational Natural Language LearningAug. 2008, pp. 253-257 (Year: 2008).*

(Continued)

*Primary Examiner* — Mark D Featherstone
*Assistant Examiner* — Kweku William Halm
(74) *Attorney, Agent, or Firm* — Klarquist Sparkman, LLP

(57) ABSTRACT

Crux detection in search definition sets is provided herein. Crux detection can include generating a hierarchical representation of a search definition set. The hierarchical representation can be reduced by removing search definitions unrelated to a target search definition. The search definitions in the reduced hierarchical representation can be focused by removing inapplicable elements or operations in the search definitions. Focusing the search definitions in the reduced hierarchical representation can include removing context-irrelevant elements and/or removing search-definition-irrelevant elements. The focused reduced hierarchical representation can be analyzed to identify implementation cruxes in the search definitions. Cruxes can include performance-impacting elements of the search definitions. The cruxes can be tagged and provided for redevelopment or analysis.

14 Claims, 9 Drawing Sheets

(56) References Cited

U.S. PATENT DOCUMENTS

| | | |
|---|---|---|
| 10,331,666 B1 | 6/2019 | Waas |
| 10,365,896 B2 | 7/2019 | Finke et al. |
| 2004/0220923 A1* | 11/2004 | Nica .................. G06F 16/24544 |
| 2005/0049946 A1 | 3/2005 | Mueller et al. |
| 2005/0049947 A1 | 3/2005 | Mueller et al. |
| 2007/0074189 A1* | 3/2007 | Srinivas .............. G06F 11/3612 |
| | | 717/144 |
| 2007/0156383 A1 | 7/2007 | Zenz et al. |
| 2007/0156715 A1 | 7/2007 | Mueller et al. |
| 2007/0156717 A1 | 7/2007 | Zenz et al. |
| 2007/0168965 A1 | 7/2007 | Zenz et al. |
| 2009/0089785 A1 | 4/2009 | Marwinski et al. |
| 2013/0138418 A1 | 5/2013 | Finke et al. |
| 2013/0138670 A1 | 5/2013 | Ludwig et al. |
| 2013/0138719 A1 | 5/2013 | Buchmann et al. |
| 2013/0166550 A1 | 6/2013 | Buchmann et al. |
| 2013/0166563 A1 | 6/2013 | Mueller et al. |
| 2013/0218762 A1 | 8/2013 | Mueller et al. |
| 2013/0282710 A1* | 10/2013 | Raghavan ............. G06F 16/838 |
| | | 707/728 |
| 2014/0149450 A1 | 5/2014 | Seufert et al. |
| 2017/0004531 A1* | 1/2017 | Seetharama ....... G06Q 30/0256 |
| 2018/0038929 A1* | 2/2018 | Paulini ................ G01R 33/543 |
| 2019/0362007 A1* | 11/2019 | Jeong ................ G06F 16/24545 |
| 2020/0004749 A1* | 1/2020 | Slezak .................. G06N 7/005 |
| 2020/0111018 A1* | 4/2020 | Golovin ................ G06N 5/003 |
| 2020/0320045 A1* | 10/2020 | Piecko ................ G06F 16/258 |

OTHER PUBLICATIONS

European Search Report received in counterpart European Patent Application No. 20199237.7 dated Mar. 18, 2021, 13 pages.

Cali et al., "Querying Data Under Access Limitations," Data Engineering, 2008, ICDE 2008, IEEE 24$^{th}$ International Conference on, Apr. 7, 2008, pp. 50-59, 10 pages.

Hirakawa, "Graph Branch Algorithm," Main Conference Poster Sessions, Association for Computational Linguistics, N. Eight Street, Stroudsburg, PA, Jul. 17, 2006, pp. 361-368, 8 pages.

Office Action received in counterpart European Patent Application No. 20199237.7, dated Nov. 11, 2022, 15 pages.

Song et al., "Semantic query graph based SPARQL generation from natural language questions," *Cluster Computing*, 2:S847-S585 (Nov. 14, 2017), 12 pages.

* cited by examiner

CRUX DETECTION IN SEARCH DEFINITIONS

BACKGROUND

The amount of data in database and enterprise systems continues to increase at a high pace. Generally, pre-defined searches are used to access such data. Often, such pre-defined searches are complex, and need to be analyzed, tested, or otherwise reviewed by developers, administrators, or users for correctness or efficiency. Such analysis is generally done manually, which can be prohibitively difficult, time-consuming, or expensive, thus leading to incorrect or inefficient searches. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of crux detection is provided herein. A dependency graph for a search definition set can be generated. The dependency graph can include nodes representing search definitions of the search definition set and the dependency graph can indicate dependency between search definitions in the search definition set. The dependency graph can be reduced for a given search definition. The reducing can remove search definitions on which the given search definition does not depend. The given search definition can be a root of a tree within the dependency graph. Elements can be removed in the given search definition of the reduced dependency graph based on context criteria. Elements can be removed in the remaining search definitions of the reduced dependency graph based on search definition criteria. One or more implementation crux elements can be identified in the search definitions of the reduced dependency graph.

One or more non-transitory computer-readable storage media storing computer-executable instructions for causing a computing system to perform a method of crux detection is provided herein. A request to identify implementation cruxes in a search definition set can be received. A hierarchical representation of the search definition set can be accessed. The hierarchical representation can be reduced based on an initial search definition. The reducing can include removing search definitions unrelated to the initial search definition based on the hierarchical representation. The reduced hierarchical representation can be focused. The focusing can include removing elements of the initial search definition based on context criteria and removing elements of remaining search definitions in the reduced hierarchical representation based on search definition criteria. One or more implementation cruxes can be identified in the search definitions of the reduced focused hierarchical representation based on crux criteria. The identified implementation cruxes can be provided.

A system capable of performing crux detection operations is provided herein. A request to identify implementation cruxes in a set of queries can be received. A hierarchical representation of the set of queries can be generated. The hierarchical representation can indicate dependencies between queries in the set of queries. The hierarchical representation of the set of queries can be accessed. A starting query in the set of queries can be identified. The hierarchical representation can be reduced. Reducing the hierarchical representation can include: identifying one or more extra queries unrelated to the starting query within the set of queries based on the hierarchical representation and removing the one or more identified extra queries. The reduced hierarchical representation can be focused. Focusing the reduced hierarchical representation can include: analyzing at least the starting query in the reduced hierarchical representation to determine relevant elements in the starting query based on context criteria, where the analyzing includes setting a given relevance indicator associated with a given query element to indicate relevance as determined based on the context criteria, removing elements in at least the starting query based on their respective associated context relevance indicators, where removed elements have associated indicators not indicating relevance, analyzing one or more queries in the reduced hierarchical representation to determine relevant elements based on search definition criteria, where the analyzing includes setting the given relevance indicator associated with the given query element to indicate relevance as determined based on the search definition criteria, and removing elements in the one or more queries based on their respective associated relevance indicators, where removed elements have associated indicators not indicating relevance. The queries in the reduced focused hierarchical representation can be analyzed to identify implementation cruxes in the queries based on crux criteria. A list of identified implementation cruxes can be generated. The generated list of identified implementation cruxes can be provided.

The foregoing and other objects, features, and advantages of the invention will become more apparent from the following detailed description, which proceeds with reference to the accompanying figures.

DETAILED DESCRIPTION

Example 1—Overview

Figure 1:
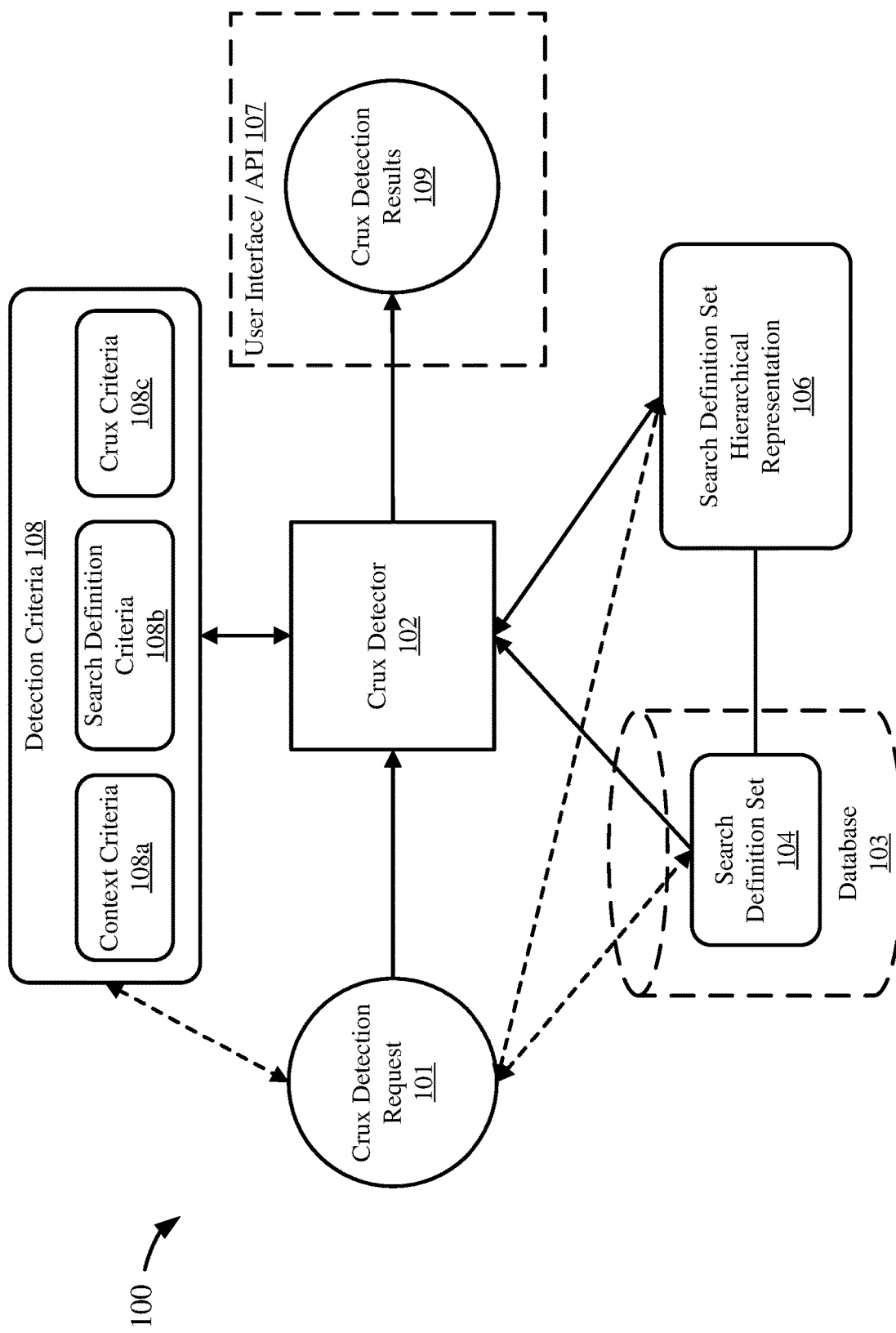
FIG. 1 is a block diagram of an example system implementing crux detection.

The ever-increasing amount of incoming data and transformation of the enterprise into a data-driven world creates many difficulties as data is indeed accumulated. In particular, accessing and finding relevant data by searching is a key component of modern data usage. Searching can be accomplished through search models, which can embrace most or all information necessary to execute a successful search. For example, such information can include: request fields (e.g. in which columns a search term should or could be found), freestyle search request fields (e.g. which columns to consider in a freestyle or user-defined search), relevance of freestyle search request fields (e.g. degree of relevancy of a hit in a given column), facetted search request fields (e.g. which columns are relevant to a facetted search), advanced search request fields (e.g. which columns should be enabled for an advanced search), auto-completion request fields (e.g. for which columns the auto-complete feature should be provided), response fields (e.g. which columns should be a part of the search result), title response fields (e.g. which columns are relevant to the title of a search hit), authorization checks (e.g. which authorizations are requested to access which data), boosts (e.g. which hits should be boosted, promoted, or highlighted), field semantics (e.g. which search configuration to use based on semantics related to the search fields or search), or others, in any combination thereof. A search model can include many different searches of many different types, which can work together, either directly, indirectly (e.g. by subject matter or conceptually).

A search can be expressed as a search definition. A search definition can be written in, in whole or in part, a database language or a search language, and generally includes different elements or operations. Some operations can be specific to a database language or search language, and can include "heavy or tricky" operations or elements, or other key or defining operations for a given search. Such operations or elements can be cruxes for their search, and can impact the search's execution, performance, accuracy, or results (or other aspects of the search in a search model). Thus, identifying such cruxes in a search can be important for accurately or efficiently developing or improving the search.

Further, whether or not a particular element or operation in a search is a crux can depend upon where in the search or in a set of interrelated or interdependent searches the particular operation is implemented. Thus, an element's position in a search stack can help determine if the element is an implementation crux for the search. Further, searches are often highly interdependent or interrelated, resulting in a deep search stack, while each search can include many potential crux elements. These reasons can make it very difficult for a search developer (or tester, etc.) to determine if a given element in a search is a crux for the search, to such a point it is often not feasible for a search developer to manually review searches or a search model to identify cruxes. However, identifying cruxes in a search can help to significantly improve search quality across many factors, such as accuracy, results, performance, and so on.

The crux detection functionality described herein can help alleviate these concerns by identifying implementation cruxes in a search model or set of search definitions. Once identified, a search developer, search administrator, or technical user (etc.) can make affirmative decisions on how to improve or alter the identified cruxes to improve the searches, and thereby improving search performance and functionality. Further advantages of crux detection, as described herein include providing an automated technique for scanning an entire search definition set for cruxes, reduce development and support time of searches, support late-stage changes to searches through automated checking and analysis, improve performance by reducing database engine workload through improved search definitions, reduce database operating expenses through executing more efficient searches which allow for a smaller database footprint (e.g. resource usage), avoid manual errors in search definition analysis and testing, and offering a test or analytical method independent of concrete or specific test data (and thereby avoiding the expense of generating test data).

Crux detection as described herein generally uses a structural approach to identify cruxes in searches and thereby improve search performance. A structural approach focuses on the elements in the searches, how they are connected, and how the searches are connected within a set (e.g. interdependent). By using a structural approach to identify crux elements in a search, the results are not dependent upon particular data sets or particular tests, but are broadly correct and useful in most, or in some cases all, scenarios.

Crux detection functionality, as described herein, can be used as part of search definition development, testing, or maintenance. Generally, crux detection can be used to analyze and improve a search before executing the search, and so can supplement search optimization routines used during search execution by improving search quality before execution or optimization.

In some cases, in addition to providing crux detection results to developers, testers, or administrators, crux detection results can be provided to analytical software, similar to testing algorithms or compiler optimization routines, for making or recommending changes to the search definitions based on the identified cruxes.

Crux detection functionality, and other search analysis functionality as described herein, can be provided in integrated development environments (IDEs), data management software, data integration software, ERP software, database or database management systems, or other code or search analysis software systems. Examples of such tools are: SAP Enterprise Search™ technology, SAP NetWeaver Application Server™ technology, SAP S/4HANA™ technology, SAP S/4HANA Cloud™ technology, SAP S/4HANA On Premise™ technology, all by SAP SE of Walldorf, Germany.

Example 2—Example System that Detects Cruxes in Search Definitions Across Search Definition Sets FIG. 1 is a block diagram of an example system 100 implementing crux detection. A crux detector 102 can automatically generate crux detection results 109, which can identify one or more cruxes in a search definition or a search definition set 104. The crux detector 102 can provide crux detection functionality directly, or it may be integrated in an application, such as an integrated development environment (IDE) or with a user interface 107.

The crux detector 102 can receive a crux detection request 101. The request 101 can be a function call or can be made through an API or other interface (e.g. 107) of the crux detector 102. In some embodiments, the request 101 can be a trigger which initiates functionality in the crux detector 102, such as based on an input or a context change.

The crux detection request 101 can include one or more variables for generating the requested crux results 109. For example, the request 101 can include a reference to a search definition set 104 to analyze to detect cruxes. Such a reference can include a search definition set identifier or a location for the search definition set 104, such as a database 103 housing or implementing the search definition set (and can further include identifiers or locations for such searches within the database), or a combination thereof. In some embodiments, the request 101 can include the search definition set 104 itself, such as stored in a data structure or file.

Further, the crux detection request 101 can include a reference to a hierarchical representation of the search definition set 106, which can include an identifier or location for the hierarchical representation. In some embodiments, the request 101 can include the hierarchical representation 106 itself, such as stored in a data structure or file.

Further, the crux detection request 101 can include a reference to detection criteria 108, or to the separate types of detection criteria 108a-c, which can include an identifier or location for the detection criteria. In some embodiments, the request 101 can include the detection criteria 108, such as stored in a data structure or file.

In some embodiments, request 101 inputs such as the search definition set 104, the detection criteria 108, and/or the hierarchical representation 106 can be determined based on a context of the crux detector 102 when it receives the request. For example, if the request 101 is generated in an IDE to trigger the crux detector 102, such inputs 104, 106, 108 (and/or other inputs) can be obtained for the request or the crux detector by the context of the request in the IDE.

The crux detection request 101 can also include one or more configurable configuration settings or options, such as a value indicating a preferred type of results 109 report, an indicator for availability of a hierarchical representation 106 applicable to the request 101, or a threshold score for detected cruxes in the search definition set.

The crux detector 102 can access a search definition set 104 for generating crux detection results 109 as described herein. The search definition set 104 can be obtained from a database 103, such as based on the crux detection request 101. The search definition set 104 can include one or more existing search definitions, which can be identified individually or as a group or set of groups.

The crux detector 102 can access a hierarchical representation 106 of the search definition set 104 for analyzing to detect cruxes 109 as described herein. In some cases, the hierarchical representation 106 can be accessed based on the crux detection request 101. In some embodiments, the crux detector 102 can generate the hierarchical representation 106 based on the search definition set 104. For example, the crux detector 102 can determine if a hierarchical representation 106 of the search definition set 104 is available; if so, the crux detector can access the hierarchical representation to before crux detection analysis, whereas if a hierarchical representation is not available (or otherwise unsuitable), the crux detector can generate the hierarchical representation based on the search definition set for use in crux detection.

The crux detector 102 can analyze the search definition set 104 through the hierarchical representation 106 to generate crux detection results 109. The crux detection results 109 can include one or more cruxes detected in the search definitions of the search definition set 104. The crux detector 102 can use the detection criteria 108 to detect cruxes in the search definition set 104. For example, the crux detector 102 can use context criteria 108a and/or search definition criteria 108b to focus on portions (e.g. elements) of the search definitions in the search definition set 104 that are likely to be or include cruxes. Further, the crux detector 102 can use crux criteria 108c to identify particular portions (e.g. elements) of the searches that qualify as cruxes. The detection criteria 108 can be used in conjunction with the hierarchical representation 106 to focus the search definitions in the search definition set 104 and detect cruxes therein.

The crux detection results 109 can be provided through a user interface/API 107, such as by displaying a list or report of detected cruxes and the particular search definitions in which they are found, or by providing a file or data structure(s) of the detected cruxes via an interface, such as in a return from a service or function call, or a messaging system.

In practice, the systems shown herein, such as system 100, can vary in complexity, with additional functionality, more complex components, and the like. For example, there can be additional functionality within the crux detector 102. Additional components can be included to implement security, redundancy, load balancing, report design, and the like. The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the instructions for implementing the crux detector 102, the input, output and intermediate data of running the crux detector 102, or the database 103 or the user interface/API 107, and the like can be stored in one or more computer-readable storage media or computer-readable storage devices. The technologies described herein can be generic to the specifics of operating systems or hardware and can be applied in any variety of environments to take advantage of the described features.

Figure 2:
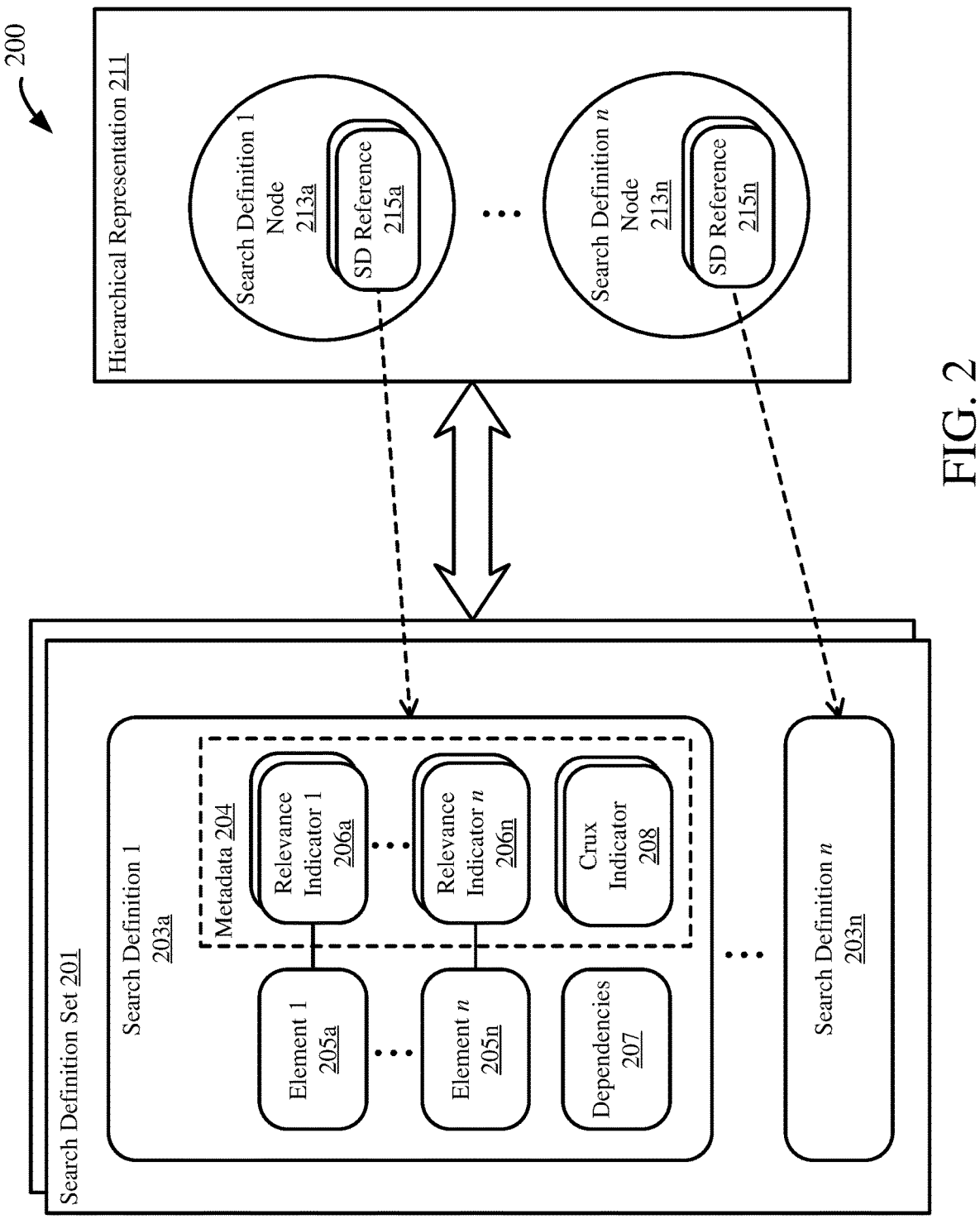
FIG. 2 is an entity diagram depicting a search definition set and hierarchical representation arrangement.

Example 3—Example Search Definitions Set and Hierarchical Representation Arrangement FIG. 2 is an entity diagram depicting a search definition set and hierarchical representation arrangement 200. A crux detector, as described herein, can detect cruxes in search definition sets 201 using hierarchical representations 211, as similarly described and shown in FIG. 1.

A search definition set 201 can include one or more search definitions, such as Search Definition 1 through Search Definition n 203a-n. A search definition 203a-n can include one or more elements 205a-n, which define the search described by the search definition. A search definition 203a-n can further include one or more dependencies 207, such as with other searches in the search definition set 201. A dependency 207 can be an element 205a-n, or a portion of an element. Generally, a dependency can be found within an element 205a-n. A search definition 203a-n can also include metadata 204 about the search definition. The metadata 204 can include relevance indicators 206a-n for the elements 205a-n in the search definition 203a-n. A particular element 205a-n can have or otherwise be associated with one or more relevance indicators 206a-n. For example, a given element, e.g. 205a, can have a context relevance indicator and a search-definition relevance indicator, e.g. 206a. A search definition 203a-n can also include one or more crux indicators 208, to indicate if a crux is found within the search definition or in the search definition set 201. In some embodiments, the crux indicators 208 can be associated with particular elements 205a-n, to indicate if a given element is a crux.

A search definition set 201 can be represented by a hierarchical representation 211. A hierarchical representation 211 can include one or more nodes 213a-n. Generally, a node 213a-n can be associated with (e.g. represent) a particular search definition 203a-n in the search definition set 201. The nodes 213a-n can include search definition references 215a-n, which can indicate the search definition 203*a-n* represented by that node. For example, the Search Definition 1 Node 213*a* can represent the Search Definition 1 203*a*, and can include a reference to Search Definition 1, SD reference 215*a*. The nodes 213*a-n* can include other information as well about their associated search definitions.

In some embodiments, the search definition metadata 204 can reside in the search definition (e.g. 203*a*), or can be closely linked or associated with the search definition. In other embodiments, the metadata 204 can be included in the search definition node 213*a-n*, or outside the search definition 203*a-n* and the hierarchical representation 211, but associated with the search definitions and/or the hierarchical representation.

A search definition set 201 can have one or more copies or instances of itself (e.g. the search definitions 203*a-n*). Such copies or instances can include variations of the original search definitions 203*a-n*, such as may be generated or updated through or during crux detection as described herein. For example, a working copy of the search definition set 201 can be created for use in crux detection. A hierarchical representation 211 may also reference such copies of the search definition set 201. For example, a node 213*a-n*, such as Search Definition 1 Node 213*a*, can include additional references 215*a* to such additional copies of its associated search definition, e.g. Search Definition 1 203*a*.

Example 4—Example Method that Detects Cruxes in a Search Definition Set

Figure 3:
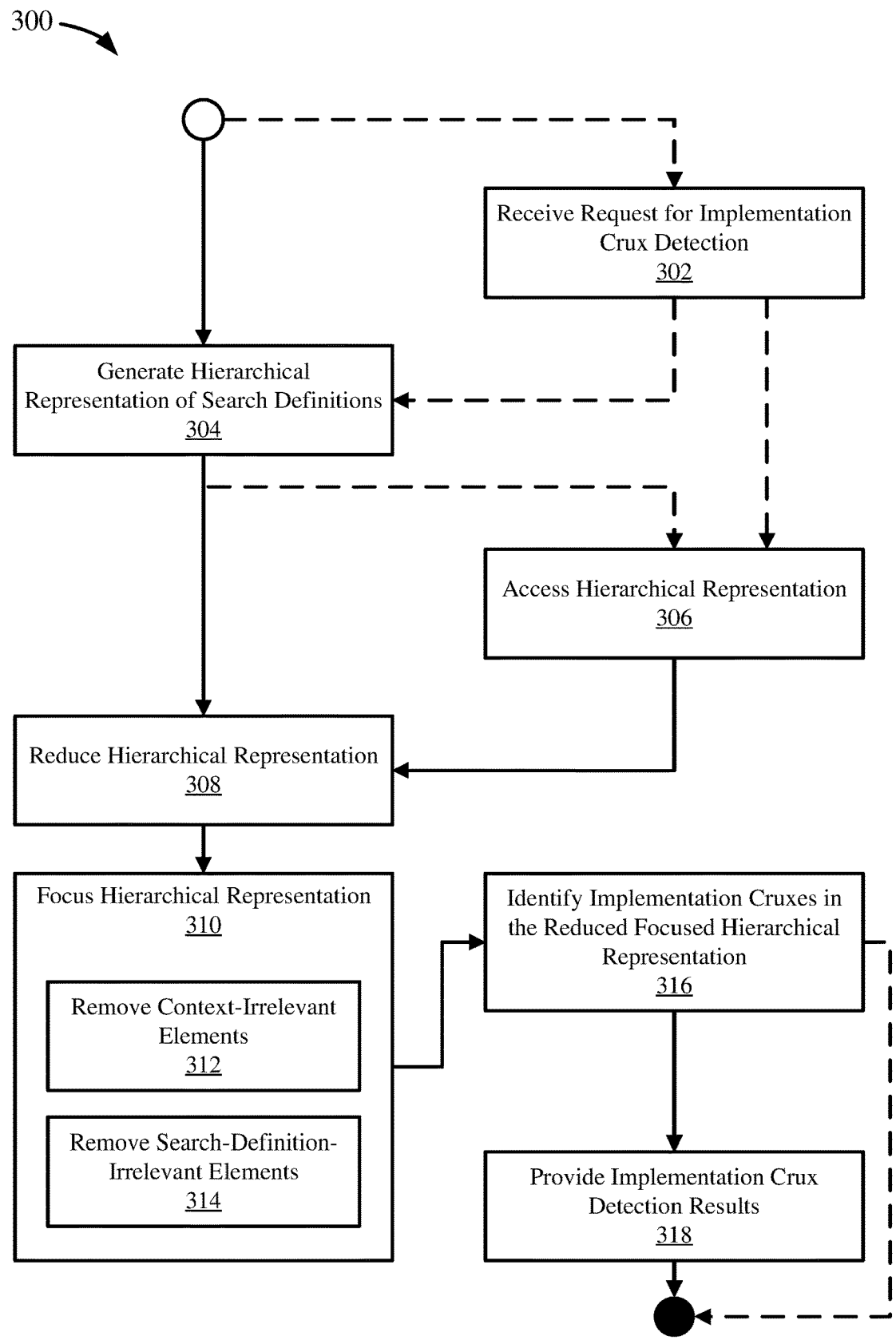
FIG. 3 is a flowchart of an example method of analyzing a search definition set to detect one or more cruxes.

FIG. 3 is a flowchart of an example method 300 of analyzing a search definition set to detect one or more cruxes, and can be implemented, for example, by the system described in FIG. 1 and using data objects as described in FIG. 2.

At 302, a request for crux detection can be received. A crux detection request can include one or more variables or input arguments, such as described herein. For example, a crux detection request can include a search definition set or an identifier or location for a search definition set, a hierarchical representation or an identifier or location for a hierarchical representation, detection criteria, a target (e.g. starting or initial) search definition, or other settings for detecting cruxes in a search definition set.

At 304, a hierarchical representation of the search definitions in the search definition set can be generated. Generating the hierarchical structure can include identifying the search definitions in the search definition set and arranging the search definitions based on dependencies between them. Generally, the hierarchical representation can include nodes or other data structure, which represent the search definitions, which are arranged based on the dependencies between their respective search definitions.

For example, generating the hierarchical representation at 304 can include identifying the discrete search definitions for analysis. Identifying the search definitions can include putting the search definitions into a queue (e.g. identifiers for the search definitions). For each of the identified search definitions (e.g. the definitions in the queue), generating the hierarchical representation at 304 can include identifying references to other search definitions within the current search definition. For example, an SQL search definition can reference other search definitions in a FROM clause or an ASSOCIATION-TO clause. Found search definition references can be recorded along with the dependency (e.g. a node can be created and linked to the current node based on the dependency), and further any search definition found that is not currently known (e.g. in the queue) can be added to the set to analyze (e.g. added to the queue). Analyzing the complete set of search definitions, including new search definitions discovered by reference within a search definition, and recording their dependencies, such as by generating and linking nodes, can result in a complete hierarchical representation of the search definitions in the search definition set.

At 306, a hierarchical representation of the search definition set can be accessed. In some embodiments, the hierarchical representation can have been created at step 304, and so accessing the hierarchical representation may be accomplished by completing the generation of the hierarchical representation. In other embodiments, the hierarchical representation may not have been generated at 304, such as when it was already available at the start of the crux detection process 300. In such scenarios, the hierarchical representation can be accessed at 306 based on the received crux detection request from 302, which can include de-referencing an identifier or pointer, accessing a data storage facility or repository, data file, data structure, or memory location. In some cases, the hierarchical representation can be available in local memory, and so readily accessible.

At 308, the hierarchical representation can be reduced. Reducing the hierarchical representation at 308 can include removing search definitions (e.g. nodes) from the hierarchical representation which are not related to a target (e.g. starting, initial, root) search definition. For example, for a given starting search definition (e.g. node), the hierarchical representation can be reduced to include only search definitions (e.g. nodes) upon which the target search definition depends, either directly or indirectly. Removing an unrelated search definition can include deleting the search definition (e.g. node) from the hierarchical representation, or setting a flag (or other indicator) to show that the search definition should be ignored. Alternatively or additionally, removing unrelated search definitions can include setting a flag (or other indicator) to show that search definitions connected (e.g. related to the target search definition) should be analyzed. Such flags can be set by traversing the hierarchical representation starting from the target search definition.

Additionally or alternatively, each search definition in the hierarchical representation can be analyzed. If the target search definition does not depend (directly or indirectly) on a given search definition, flag that given search definition for removal (e.g. set an indicator for deletion, set an indicator to ignore, or delete it from the hierarchical representation). Thereafter, any search definitions flagged for removal can be deleted from the hierarchical representation (if such is the embodiment).

Reducing the hierarchical representation at 308 can include generating a copy of the hierarchical representation and reducing the copy.

Generally, reducing the hierarchical representation at 308 can improve the efficiency of detecting cruxes in the search definitions, such as by limiting the number of objects to be analyzed. Further, reducing the hierarchical representation can help increase the accuracy of the structural approach to crux detection by removing unnecessary structure, which could introduce incorrect analysis or results.

At 310, the reduced hierarchical representation can be focused. Focusing the hierarchical representation at 310 can include removing irrelevant or unnecessary elements from the search definitions represented by the reduced hierarchical representation. Such elements can include elements known to be unrelated or inapplicable to crux identification (e.g. elements that won't be cruxes). Focusing the hierarchical representation at 310 can include identifying such inapplicable or irrelevant elements based on particular criteria. Once identified, the hierarchical representation can be focused by deleting or flagging the inapplicable or irrelevant elements to be ignored (skipped, or otherwise remain unanalyzed).

Focusing the hierarchical representation at 310 can include generating copies of the search definitions represented by the hierarchical representation and focusing the copies. The hierarchical representation can be updated to include references to the copies in place of or in addition to the original (e.g. previous) search definitions. In some embodiments, such copies of the search definitions can be generated in a special or different format, such as a structured representation, which can facilitate analysis (e.g. search and detection) and tagging of elements.

Focusing the hierarchical representation at 310 can include removing context-irrelevant elements at 312 and/or removing search-definition-irrelevant elements at 314. In some embodiments, removing context-irrelevant elements 312 and removing search-definition-irrelevant elements 314 can be performed in order (e.g. one before the other). In other embodiments, removing context-irrelevant elements 312 and removing search-definition-irrelevant elements 314 can be done in parallel, or can be integrated, such as in a step-wise process (e.g. perform one or both for one node, traverse to the next node, perform one or both for this node, and so on).

Removing context-irrelevant elements at 312 can include analyzing one or more search definitions based on the hierarchical representation to identify inapplicable or irrelevant elements based on context. Identifying inapplicable or irrelevant elements based on context can include analyzing or comparing the elements to context criteria. Elements matching the context criteria can be removed, such as by deleting or tagging to delete (and later removed, such as in aggregate) or ignore, from the search definition. Alternatively, the context criteria can identify applicable or relevant elements, and elements not matching the criteria can be removed.

Generally, removing context-irrelevant elements at 312 is performed against the top-level search definition according to the hierarchical representation (e.g. against the search definition represented by the root node). In some additional or alternative embodiments, removing context-irrelevant elements at 312 can be performed against additional or further search definitions based on the hierarchical representation.

Removing search-definition-irrelevant elements at 314 can include analyzing one or more search definitions based on the hierarchical representation to identify inapplicable or irrelevant elements based on the search definition. Identifying inapplicable or irrelevant elements based on the search definition can include analyzing or comparing the elements to search-definition criteria. Elements matching the search-definition criteria can be removed, such as by deleting or tagging to delete (and later removed, such as in aggregate) or ignore, from the search definition. Alternatively, the search-definition criteria can identify applicable or relevant elements, and elements not matching the criteria can be removed.

Generally, removing search-definition-irrelevant elements at 314 is performed against all search definitions except the top-level search definition according to the hierarchical representation (e.g. against all but the the search definition represented by the root node). In some additional or alternative embodiments, removing search-definition-irrelevant elements at 314 can be performed against the top-level search definition according to the hierarchical representation, or against a subset of the search definitions in the hierarchical representation.

Focusing the hierarchical representation at 310 can include traversing the hierarchical representation and performing the analysis to remove inapplicable or irrelevant elements (e.g. 312 and/or 314 as applicable) during the traversal. Generally, the traversal includes analyzing parent (e.g. higher level) search definitions before child (e.g. lower level) search definitions. Performing steps 308 and 310 (e.g. including 312 and/or 314) can result in a fully reduced hierarchical representation.

Generally, focusing the hierarchical representation at 310 can improve the efficiency of detecting cruxes in the search definitions, such as by limiting the number of objects to be analyzed. Further, focusing the hierarchical representation can help increase the accuracy of the structural approach to crux detection by removing unnecessary elements, which could introduce incorrect analysis or results.

At 316, cruxes can be identified in the reduced and focused hierarchical representation. Identifying cruxes at 316 can include analyzing the remaining elements of the search definitions based on the reduced and focused hierarchical representation. For example, the hierarchical representation can include traversing the hierarchical representation and analyzing the search definitions for cruxes during the traversal. Analyzing a search definition to identify cruxes can include analyzing or comparing elements of the search definition against crux criteria. Additionally or alternatively, the analysis to identify cruxes can include analyzing the elements against their location or place within the hierarchical representation, such as compared to a parent search definition.

When a crux is identified, the crux element can be flagged as containing a crux (e.g. a crux indicator associated with the element can be set to indicate the element is a crux). Further, the search definition can additionally or alternatively be flagged as containing a crux element. Further, the top-level search definition based on the hierarchical representation can be flagged to indicate the search definition set contains a crux (or the hierarchical representation can be flagged additionally or alternatively).

At 318, the crux detection results can be provided. Providing cruxes at 318 can be performed based, at least in part, on crux indicators or other flags set at 316. Providing the crux detection results can include displaying the search definitions determined to have cruxes, such as in a list. Alternatively or additionally, the cruxes (e.g. elements of the search definitions identified as cruxes) detected in the search definitions can be displayed, or can be highlighted in a display of the search definition(s). Additionally or alternatively, a report can be provided including the crux detection results, such as delineating the search definitions determined to have cruxes and/or listing the elements identified as cruxes for the various search definitions. In some embodiments, providing the crux detection results at 318 can include providing a data structure storing the results through an API, such as to another system, or through a messaging interface.

In some embodiments, the crux detection results can be provided to a code analyzer or optimizer. Such a code analyzer or optimizer (e.g. an optimizer in a compiler) can change one or more of the cruxes to an improved operation or set of operations (e.g. a less resource-intensive form). Alternatively or additionally, such a code analyzer or optimizer can provide suggestions for altering one or more of the cruxes to improve performance, or results, or the like. Such suggestions can be provided along with the cruxes, such as displayed in an IDE.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Figure 4A:
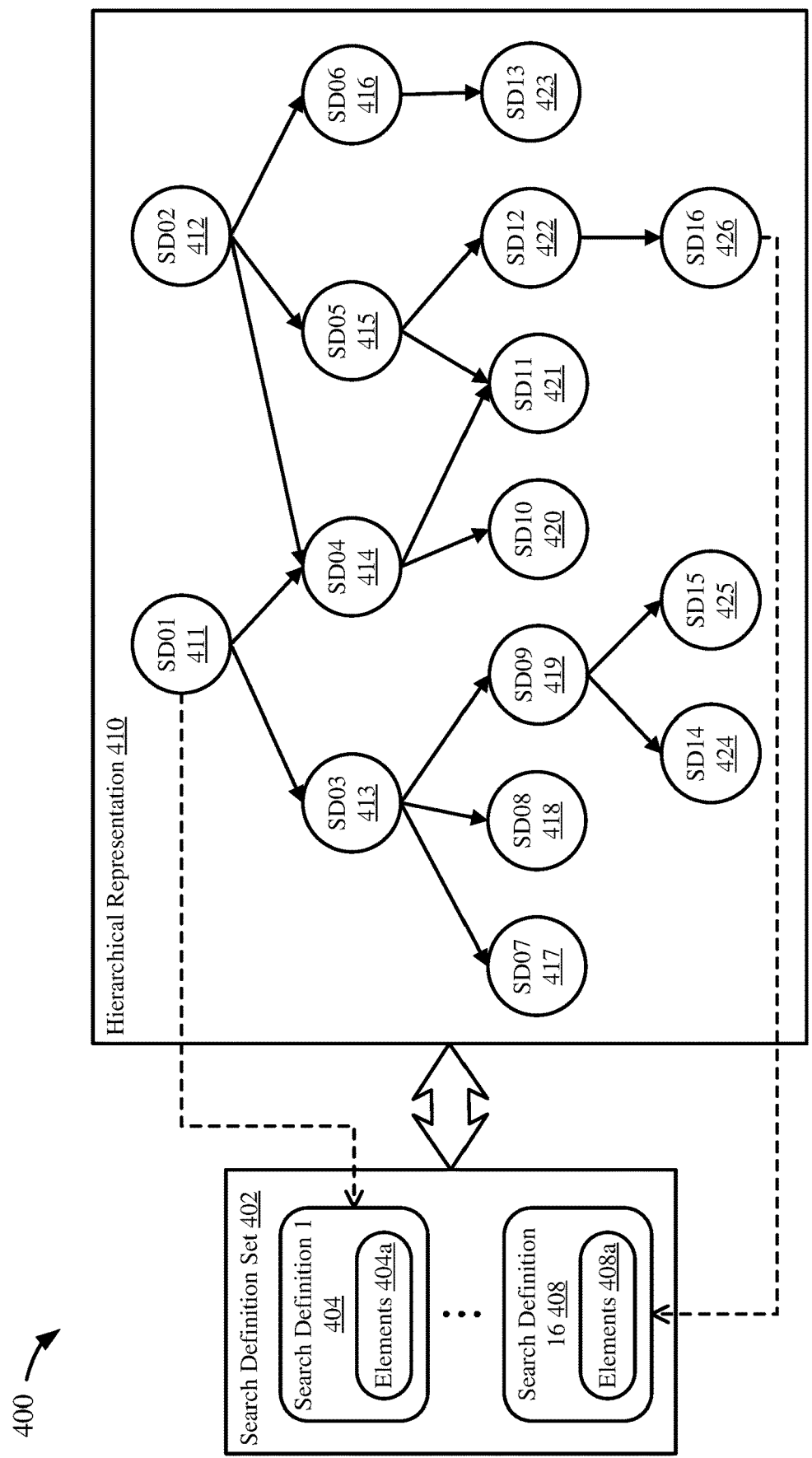
FIGS. 4A-C are an example illustrating how a search definition set can be represented in a hierarchical representation, which can be transformed for crux detection analysis.
Figure 4B:
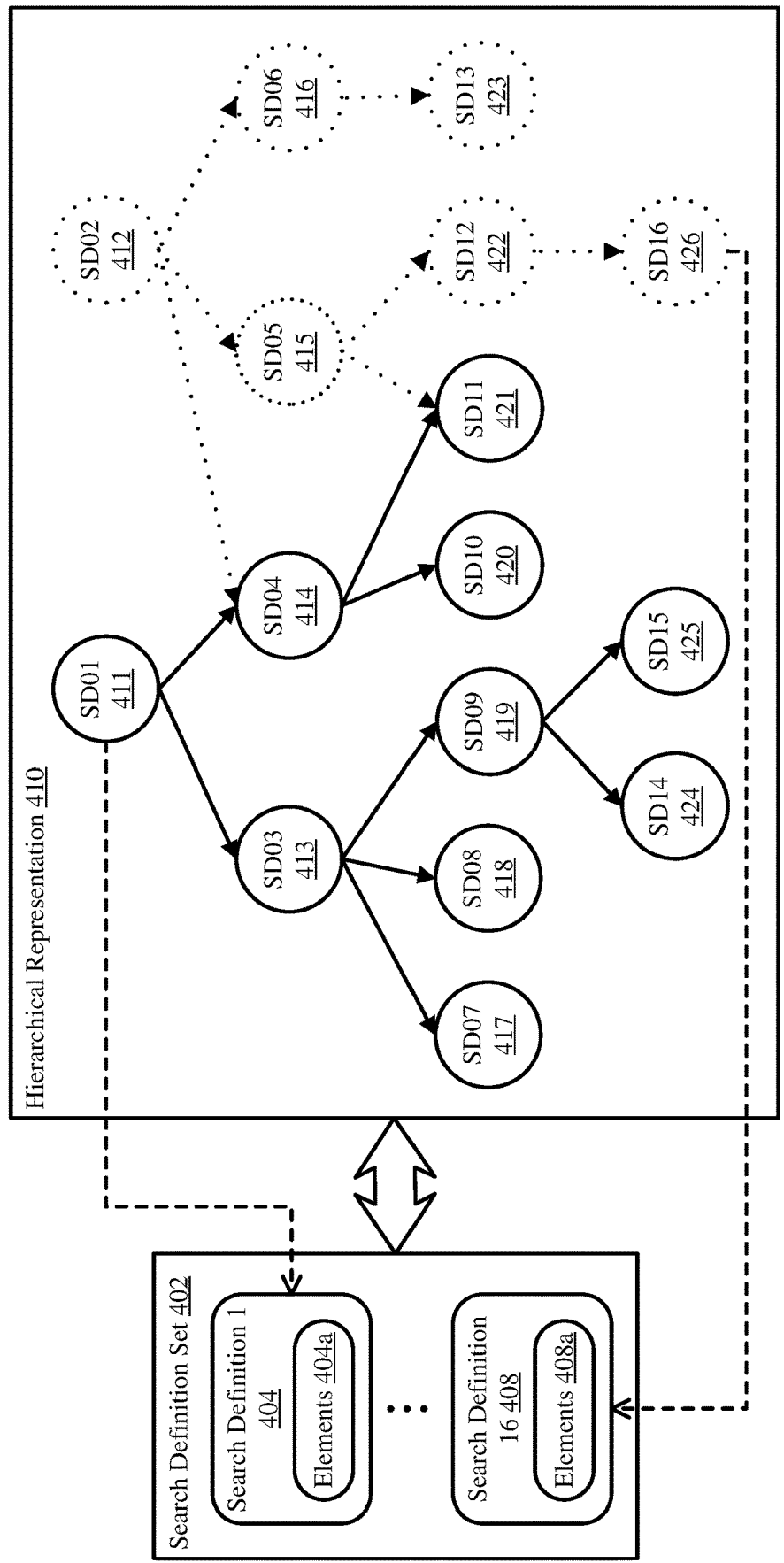
Figure 4C:
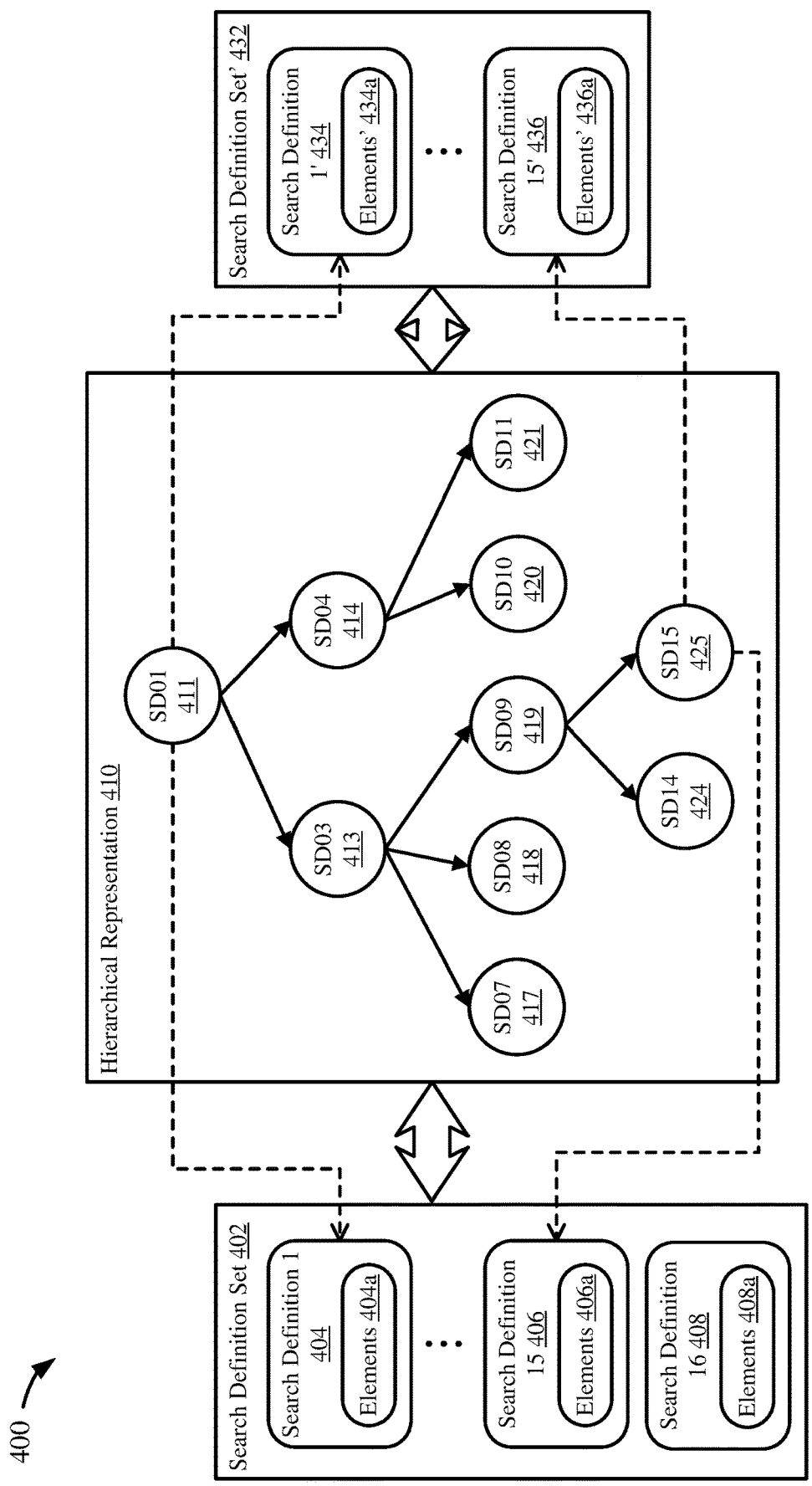

Example 5—Example Search Definition Set, Hierarchical Representation, and Transformation of the Search Definition Set and Hierarchical Representation FIGS. 4A-C are an example 400 illustrating how a search definition set can be represented in a hierarchical representation, which can then be transformed for crux detection analysis. The example 400 illustrates, in part, the process 300 shown in FIG. 3 through the search definition set 402 and its hierarchical representation. FIG. 4A illustrates a search definition set 402 and an associated hierarchical representation 410. A search definition set 402 can include Search Definition 1 404, having Elements 404a, through Search Definition 16 408, having Elements 408a.

The Search Definition Set 402 can be represented by the Hierarchical Representation 410. The hierarchical representation 410 can include nodes SD01-SD16 411-426 representing the Search Definitions 1-16 404, 408. The nodes 411-426 can be arranged based on dependencies between the search definitions 1-16 404, 408. The nodes 411-426 can reference their respective search definitions 404, 408. For example, node SD01 411 can point to Search Definition 1 404, such as through a name, location, other identifier, or combination thereof.

FIG. 4B continues the example 400, illustrating a reduced hierarchical representation 410. Based on the target search definition being Search Definition 1 404, represented by SD01 411, the hierarchical representation 410 can be reduced by removing the nodes of search definitions unrelated to SD01 411, which are SD02 412, SD05 415, SD06 416, SD12 422, SD13 423, and SD16 426. Removing these unrelated nodes 412, 415, 416, 422, 423, 426 can including flagging the nodes to be ignored or deleting them from the hierarchical representation 410, as described herein.

FIG. 4C continues the example 400, illustrating a reduced and focused hierarchical representation 410 with the altered search definition set 432. Focusing the reduced hierarchical representation 410 can result in an altered search definition set, Search Definition Set' 432, which can include altered search definitions, Search Definition 1' 434 to Search Definition 15' 436. Generally, the focused search definitions 1'-15' 434, 436 include an altered set of elements. For example, Search Definition 1' 434 includes Elements' 434a. Generally, the altered elements are a subset of the original elements for a search definition. For example, Elements' 434a of Search Definition 1' 434 is a subset of Elements 404a of Search Definition 1 404. The new element sets 434a, 436a are the elements not removed during focusing, e.g. are elements deemed relevant or applicable to the crux detection. The nodes in the hierarchical representation 410 can include additional references to the altered search definitions 434, 436 in the focused search definition set 432. Generally, the focused search definition set 432 only includes search definitions included in the reduced hierarchical representation 410, and not search definitions in the original search definition set 402 which were removed (e.g. Search Definition 16 408 may not be included in the Search Definition Set' 432).

Example 6—Example Search Definitions, Search Definition Sets, and Elements

In any of the examples herein, a search definition can include interpretable text, code, or pseudo-code detailing a search for data against a data source. A search definition can be executable by a data source, or data management system. A search definition can be, for example, a search string, query, search object or data structure, stored procedure, database view or materialized view, or the like. For example, a search definition can be an SQL query or a CDS-based search view (Core Data Services™ technology, from SAP SE of Walldorf, Germany).

In any of the examples herein, a search definition set can be a collection of one or more search definitions. In some cases, a search definition set can represent a search model, which can express how to search or otherwise obtain one or more given classes or groupings of data. A search definition set can also be referred to as a stack, or search stack.

In any of the examples herein, an element of a search definition can include an operation, field, or other programmatic statement, or portion or clause of an operation or statement, in the search definition. In some cases or embodiments, an element can be defined, at least in part, by the line or lines of code in which the element is found.

Example 7—Example Hierarchical Representations and Search Definition Dependencies In any of the examples herein, a hierarchical representation can include a data structure or collection of data structures capable of representing connections or relations (e.g. dependencies) between items (e.g. search definitions) within the data structure. For example, a hierarchical representation can include a tree, array or multiple array, or graph data structure. In some cases, a graph representation can be a directed graph. In some cases, a hierarchical representation can include multiple top-level or root items.

In any of the examples herein, a search definition can be dependent on another search definition. Such dependencies can be direct or indirect. For example, Search 1 referencing or otherwise using Search 2 (in whole or in part), is a direct dependency. Additionally, if Search 2 references or otherwise uses Search 3 (in whole or in part), then Search 1 is indirectly dependent on Search 3 (while Search 2 is directly dependent on Search 3). A search definition can be dependent upon multiple searches, or no searches.

Example 8—Example Cruxes

In any of the examples herein, a search implementation crux, or simply implementation crux or crux, can be defined or identified by the crux criteria, as described herein (e.g. at Example 11). For example, a crux can include an element that is key to the execution or performance of the search, critical, performance-impacting, or the like. A crux can be an operation or combination of operations in a search definition. In some cases, a crux can be a particular expression or implementation in a search definition, such as a particular SQL expression or type of expression. Example operations that can be cruxes are:
- a clause like DISTINCT, GROUP BY, ORDER BY or HAVING
- an aggregate function like MIN, MAX, COUNT, SUM, AVG, MEDIAN, STDDEV or VAR
- a function like ASCII, BINTOSTR, BINTOHEX, CHAR, COALESCE, CONCAT, HAMMING_DISTANCE, HEXTOBIN, IFNULL, LCASE, LEFT, LENGTH, LIKE_REGEXPR, LOWER, LPAD, LTRIM, NCHAR, OCCURRENCES_REGEXPR, REPLACE, REPLACE_REGEXPR, RIGHT, RPAD, RTRIM, STRTOBIN, SUBSTR_AFTER, SUBSTR_BEFORE, SUBSTRING, SUBSTRING_REGEXPR, TRIM, UCASE, UNICODE or UPPER
- a CAST operation
- any other calculated element/field/column
- a (multi)set operator like UNION, UNION ALL, UNION DISTINCT, INTERSECT, INTERSECT DISTINCT, MINUS, MINUS DISTINCT, EXCEPT or EXCEPT DISTINCT
- a CASE expression
- an IS NULL predicate or an IS NOT NULL predicate
- a Sub Query
- a Join over calculated columns
- a Non-Equi Join
- a Right Outer Join, Full Outer Join or Cyclic Outer Join In some cases, a crux can be a particular combination of operations and operands, such as a JOIN between tables of a minimum size, or a GROUP BY across multiple tables, and the like. In some cases, a crux can be an element or operation in a particular location within the hierarchy of search definitions, such as an operation that will be widely invoked based on the hierarchy of search definitions. Such cruxes can be defined within the crux criteria, as described herein.

In some cases, a crux can be redundant operations, either within a search definition or within different search definitions in the same search definition set. A redundant operation can include two of the same operations, or two different operations or combinations of operations which provide the same results when executed.

Often cruxes are elements which are likely to require the most resources to execute or to optimize when the search is performed. For example, cruxes can be elements which are likely to impact the speed or efficiency of the search. In some cases, a crux can be an element which is likely to most impact the results obtained from performing the search, such as by over-producing or under-producing results. In some cases, cruxes can be defined based on a particular data schema, or particular database management system implementation or arrangement. In this way, cruxes can be customized (e.g. through crux criteria) for particular search implementations, data storage or database implementations, or particular network or system implementations.

Example 9—Example Context Criteria

In any of the examples herein, context criteria can include values, rules, or logic for identifying elements that are relevant (or, alternately, irrelevant) for a search context. For example, context criteria can be used to identify elements relevant for an Enterprise search (and elements not meeting such context criteria can be deemed irrelevant for an Enterprise search). Example context criteria for identifying relevant elements of an Enterprise search are:
- . . . is part of the Enterprise Search Semantic Key (@ObjectModel.semanticKey)
- . . . is part of the Title (@UI.headerinfo.title)
- . . . is another Response Field (@UI.identification)
- . . . is a Freestyle Request Field (@Search.defaultSearchElement: true)
- . . . is a Facetted Search Request Field (@EnterpriseSearch.filteringFacet)
- . . . is an Advanced Search Field (@EnterpriseSearch.filteringAttribute)
- . . . is an Auto Completion Field (@EnterpriseSearch.defaultValueSuggestElement: true)
- . . . is a Language Code Field (@Semantics.language: true)
- . . . is referenced by a DCL (Data Control Language document)

Context criteria can generally be available in a database or other data repository, data file, registry, or data structures or objects accessible by a crux detector. In some cases, context criteria can be directly implemented in a crux detector, as described herein, or can be passed to a crux detector as part of a crux detection request.

Example 10—Example Search-Definition Criteria

In any of the examples herein, search-definition criteria can include values, rules, or logic for identifying elements that are relevant (or, alternately, irrelevant) for a given implementation of a search definition. For example, search-definition criteria can be used to identify elements relevant for a search defined in a given language, such as SQL (and elements not meeting such search-definition criteria can be deemed irrelevant for a search in that language or implementation). Example search-definition criteria for identifying relevant elements in an SQL implementation are:
- . . . is referenced by an element/field of a higher search definition
- . . . is referenced by a WHERE condition of a higher search definition
- . . . is referenced by a JOIN condition of a higher search definition
- . . . is otherwise referenced by a higher search definition Search-definition criteria can generally be available in a database or other data repository, data file, registry, or data structures or objects accessible by a crux detector. In some cases, search-definition criteria can be directly implemented in a crux detector, as described herein, or can be passed to a crux detector as part of a crux detection request.

Example 11—Example Crux Criteria

In any of the examples herein, crux criteria can include values, rules, or logic for identifying elements that are cruxes of a search definition. For example, crux criteria can be used to identify elements in a search definition that are performance-impacting. In this way, crux criteria can define one or more cruxes, thereby enabling detection of cruxes within a search definition or search definition set. Example crux criteria for identifying implementation cruxes in an SQL implementation are:
- a clause like DISTINCT, GROUP BY, ORDER BY or HAVING
- an aggregate function like MIN, MAX, COUNT, SUM, AVG, MEDIAN, STDDEV or VAR a function like ASCII, BINTOSTR, BINTOHEX, CHAR, COALESCE, CONCAT, HAMMING_DISTANCE, HEXTOBIN, IFNULL, LCASE, LEFT, LENGTH, LIKE_REGEXPR, LOWER, LPAD, LTRIM, NCHAR, OCCURRENCES_REGEXPR, REPLACE, REPLACE_REGEXPR, RIGHT, RPAD, RTRIM, STRTOBIN, SUBSTR_AFTER, SUBSTR_BEFORE, SUBSTRING, SUBSTRING_REGEXPR, TRIM, UCASE, UNICODE or UPPER a CAST operation any other calculated element/field/column a (multi)set operator like UNION, UNION ALL, UNION DISTINCT, INTERSECT, INTERSECT DISTINCT, MINUS, MINUS DISTINCT, EXCEPT or EXCEPT DISTINCT a CASE expression an IS NULL predicate or an IS NOT NULL predicate a Sub Query a Join over calculated columns a Non-Equi Join a Right Outer Join, Full Outer Join or Cyclic Outer Join Crux criteria can generally be available in a database or other data repository, data file, registry, or data structures or objects accessible by a crux detector. In some cases, crux criteria can be directly implemented in a crux detector, as described herein, or can be passed to a crux detector as part of a crux detection request.

Example 12—Example Cyclical Crux Detection in a Search Definition Set

In any of the examples herein, crux detection can be performed through multiple cycles to detect cruxes across all search definitions in a search definition set. For example, as seen in example 400 shown in FIGS. 4A-C, a hierarchical representation can include more than one top-level search definition in some cases. In such cases, crux detection, such as through process 300 shown in FIG. 3, can be repeated for each of the top-level nodes in the hierarchical representation. Further, the process in such cases need not be the entire process 300 shown in FIG. 3, but can be repeated starting from step 306 (accessing the hierarchical representation) or step 308 (reducing the hierarchical representation) through the end (step 318, providing the crux detection results), for each of the top-level nodes. In this way, each "tree" within a hierarchical representation can be analyzed for cruxes through cyclical crux detection.

In some embodiments, a target or starting search definition can be provided in a crux detection request. In additional or alternative embodiments, a crux detector can identify all top-level nodes in a hierarchical representation, and perform crux detection for each top-level nodes. Such cases can include generating copies of the hierarchical representation for use in each cycle, or clearing indicators between each cycle.

Example 13—Example CDS-Based Search View Crux Detection Transformation

The following is an example search definition (a CDS-based Search View):

```
@AbapCatalog.sqlViewName: 'ESH_U_BANK'
@AccessControl.authorizationCheck: #CHECK
@ObjectModel.usageType.serviceQuality: #P
@ClientHandling.algorithm: #SESSION_VARIABLE
@ClientHandling.type: #INHERITED
@AbapCatalog.compiler.compareFilter: true
@Metadata.allowExtensions: true
@EndUserText.label: 'Banks'
@Consumption.semanticObject: 'Bank'
@ObjectModel.semanticKey: ['BANKS', 'BANKL']
@Search.searchable: true
@EnterpriseSearch.enabled: true
@UI.headerInfo.title: {value: 'BANKL'}
define view ESH_S_BANK
with parameters
@Consumption.hidden: true
@Environment.systemField: #SYSTEM_LANGUAGE
P_Language: abap.lang
as select from ESH_N_BANK_BANK
{
@EndUserText.label: 'Bank Country'
@Consumption.semanticObject: 'BankCountry'
@Search.defaultSearchElement: true
@UI.identification: { position: 1 }
@Search.ranking: #HIGH
@EnterpriseSearch.filteringAttribute: { default, displayPosition: 1 }
banks,
@EndUserText.label: 'Bank Key'
@Consumption.semanticObject: 'Bank'
@Search.defaultSearchElement: true
@Search.ranking: #HIGH
@EnterpriseSearch.filteringAttribute: { default, displayPosition: 2 }
@EnterpriseSearch.defaultValueSuggestElement: true
@ObjectModel.text.element: ['BANKA']
@UI.textArrangement: #TEXT_LAST
bankl,
@EndUserText.label: 'Created on'
erdat,
@EndUserText.label: 'Created by'
ernam,
@EndUserText.label: 'Bank Name'
@Consumption.semanticObject: 'BankName'
@Search.defaultSearchElement: true
@Search.ranking: #HIGH
@EnterpriseSearch.filteringAttribute: { default, displayPosition: 4 }
@EnterpriseSearch.defaultValueSuggestElement: true
banka,
@EndUserText.label: 'Region'
@Consumption.semanticObject: 'Region'
@UI.identification: { position: 2 }
@Search.ranking: #MEDIUM
@Search.defaultSearchElement: true
provz,
@EndUserText.label: 'Street'
@Consumption.semanticObject: 'StreetAddressName'
@UI.identification: { position: 5 }
@Search.ranking: #MEDIUM
@Search.defaultSearchElement: true
stras,
@Consumption.semanticObject: 'CityName'
@UI.identification: { position: 4 }
@EnterpriseSearch.filteringFacet: { default, displayPosition: 6 }
@Search.ranking: #MEDIUM
@Search.defaultSearchElement: true
ort01,
@EndUserText.label: 'SWIFT Code'
@Consumption.semanticObject: 'SWIFTCode'
@Search.defaultSearchElement: true
@UI.identification: { position: 3 }
@Search.ranking: #MEDIUM
@EnterpriseSearch.filteringAttribute: { default, displayPosition: 7 }
swift,
@EndUserText.label: 'Bank Group'
@Consumption.semanticObject: 'BankGroup'
@UI.identification: { position: 7 }
@Search.ranking: #MEDIUM
@Search.defaultSearchElement: true
bgrup,
@EndUserText.label: 'Is Postbank Account'
xpgro,
@EndUserText.label: 'Is Bank Deleted'
loevm,
```

-continued

```
@EndUserText.label: 'Bank Number'
@Consumption.semanticObject: 'BankNumber'
@Search.defaultSearchElement: true
@UI.identification: { position: 6 }
@Search.ranking: #HIGH
@EnterpriseSearch.filteringAttribute: { default, displayPosition: 8 }
@EnterpriseSearch.defaultValueSuggestElement: true
bnklz,
@EndUserText.label: 'Post Bank Account Number'
@Consumption.semanticObject: 'PostOfficeBankAccountNumber'
@UI.identification: { importance: #MEDIUM, position: 6 }
pskto,
admr,
@Consumption.semanticObject: 'Branch'
@UI.identification: { position: 8 }
@Search.ranking: #MEDIUM
@Search.defaultSearchElement: true
brnch,
@EndUserText.label: 'Check Digit Cal. Method'
chkme,
@EndUserText.label: 'Bank Data Format'
vers,
@EndUserText.label: 'Bank Country Name'
@Consumption.semanticObject: 'CountryName'
@UI.identification: { position: 9 }
@EnterpriseSearch.filteringFacet: { default, displayPosition: 3 }
@Search.ranking: #MEDIUM
@Search.defaultSearchElement: true
_BANK2LAND1[ 1: DOMALANGU = $parameters.P_Language ].VALUE_TEXT as VALUE_TEXT1,
@EndUserText.label: 'Region Name'
@Consumption.semanticObject: 'ReginOfOriginName'
@UI.identification: { position: 10 }
@EnterpriseSearch.filteringFacet: { default, displayPosition: 5 }
@Search.ranking: #MEDIUM
@Search.defaultSearchElement: true
_BANK2REGION[ 1: spras = $parameters.P_Language ].bezei,
@UI.identification: { position: 12 }
@EndUserText.label:'Internal Bank Category'
@Consumption.semanticObject: 'InternalBankCategoryDesc'
_BankAdditionFields._BankCategory[ 1:Langu = $parameters.P_Language].IntBankCateg,
@EndUserText.label: 'Created by'
_BANK2USER._TO_USER_NAME.name_text,
@EndUserText.label: 'Post Bank Account'
@UI.identification: { position: 11 }
_POST_BANK_ACCT[ 1: DOMALANGU = $parameters.P_Language ].VALUE_TEXT as VALUE_TEXT2,
@EndUserText.label: 'Is Bank Deleted Text'
_BANK2XFELD[ 1: DOMALANGU = $parameters.P_Language ].VALUE_TEXT
}
```

The following is the search definition above, with context-relevant fields flagged (underlined).

```
@AbapCatalog.sqlViewName: 'ESH_U_BANK'
@AccessControl.authorizationCheck: #CHECK
@ObjectModel.usageType.serviceQuality: #P
@ClientHandling.algorithm: #SESSION_VARIABLE
@ClientHandling.type: #INHERITED
@AbapCatalog.compiler.compareFilter: true
@Metadata.allowExtensions: true
@EndUserText.label: 'Banks'
@Consumption.semanticObject: 'Bank'
@ObjectModel.semanticKey: ['BANKS', 'BANKL']
@Search.searchable: true
@EnterpriseSearch.enabled: true
@UI.headerInfo.title: {value: 'BANKL'}
define view ESH_S_BANK
with parameters
@Consumption.hidden: true
@Environment.systemField: #SYSTEM_LANGUAGE
P_Language: abap.lang
as select from ESH_N_BANK_BANK
{
@EndUserText.label: 'Bank Country'
@Consumption.semanticObject: 'BankCountry'
@Search.defaultSearchElement: true
@UI.identification: { position: 1 }
@Search.ranking: #HIGH
@EnterpriseSearch.filteringAttribute: { default, displayPosition: 1 }
banks,
@EndUserText.label: 'Bank Key'
@Consumption.semanticObject: 'Bank'
@Search.defaultSearchElement: true
@Search.ranking: #HIGH
@EnterpriseSearch.filteringAttribute: { default, displayPosition: 2 }
@EnterpriseSearch.defaultValueSuggestElement: true
@ObjectModel.text.element: [BANKA']
@UI.textArrangement: #TEXT_LAST
bankl,
@EndUserText.label: 'Created on'
erdat,
@EndUserText.label: 'Created by'
ernam,
@EndUserText.label: 'Bank Name'
@Consumption.semanticObject: 'BankName'
@Search.defaultSearchElement: true
@Search.ranking: #HIGH
@EnterpriseSearch.filteringAttribute: { default, displayPosition: 4 }
@EnterpriseSearch.defaultValueSuggestElement: true
banka,
@EndUserText.label: 'Region'
@Consumption.semanticObject: 'Region'
@UI.identification: { position: 2 }
@Search.ranking: #MEDIUM
@Search.defaultSearchElement: true
provz,
@EndUserText.label: 'Street'
@Consumption.semanticObject: 'StreetAddressName'
@UI.identification: { position: 5 }
@Search.ranking: #MEDIUM
@Search.defaultSearchElement: true
stras,
@Consumption.semanticObject: 'CityName'
@UI.identification: { position: 4 }
@EnterpriseSearch.filteringFacet: { default, displayPosition: 6 }
@Search.ranking: #MEDIUM
@Search.defaultSearchElement: true
ort01,
@EndUserText.label: 'SWIFT Code'
@Consumption.semanticObject: 'SWIFTCode'
@Search.defaultSearchElement: true
@UI.identification: { position: 3 }
@Search.ranking: #MEDIUM
@EnterpriseSearch.filteringAttribute: { default, displayPosition: 7 }
swift,
@EndUserText.label: 'Bank Group'
@Consumption.semanticObject: 'BankGroup'
@UI.identification: { position: 7 }
@Search.ranking: #MEDIUM
@Search.defaultSearchElement: true
bgrup,
@EndUserText.label: 'Is Postbank Account'
xpgro,
@EndUserText.label: 'Is Bank Deleted'
loevm,
@EndUserText.label: 'Bank Number'
@Consumption.semanticObject: 'BankNumber'
@Search.defaultSearchElement: true
@UI.identification: { position: 6 }
@Search.ranking: #HIGH
@EnterpriseSearch.filteringAttribute: { default, displayPosition: 8 }
@EnterpriseSearch.defaultValueSuggestElement: true
bnklz,
@EndUserText.label: 'Post Bank Account Number'
@Consumption.semanticObject: 'PostOfficeBankAccountNumber'
@UI.identification: { importance: #MEDIUM, position: 6 }
pskto,
admr,
@Consumption.semanticObject: 'Branch'
@UI.identification: { position: 8 }
@Search.ranking: #MEDIUM
@Search.defaultSearchElement: true
```

```
brnch,
@EndUserText.label: 'Check Digit Cal. Method'
chkme,
@EndUserText.label: 'Bank Data Format'
vers,
@EndUserText.label: 'Bank Country Name'
@Consumption.semanticObject: 'CountryName'
@UI.identification: { position: 9 }
@EnterpriseSearch.filteringFacet: { default, displayPosition: 3 }
@Search.ranking: #MEDIUM
@Search.defaultSearchElement: true
_BANK2LAND1[ 1: DOMALANGU =
$parameters.P_Language ].VALUE_TEXT as VALUE_TEXT1,
@EndUserText.label: 'Region Name'
@Consumption.semanticObject: 'ReginOfOriginName'
@UI.identification: { position: 10 }
@EnterpriseSearch.filteringFacet: { default, displayPosition: 5 }
@Search.ranking: #MEDIUM
@Search.defaultSearchElement: true
_BANK2REGION[ 1: spras = $parameters.P_Language].bezei,
@UI.identification: { position: 12 }
@EndUserText.label:'Internal Bank Category'
@Consumption.semanticObject: 'InternalBankCategoryDesc'
_BankAdditionFields._BankCategory[ 1:Langu =
$parameters.P_Language].IntBankCateg,
@EndUserText.label: 'Created by'
_BANK2USER._TO_USER_NAME.name_text,
@EndUserText.label: 'Post Bank Account'
@UI.identification: { position: 11}
POST_BANK_ACCT[ 1: DOMALANGU =
$parameters.P_Language ].VALUE_TEXT as VALUE_TEXT2,
@EndUserText.label: 'Is Bank Deleted Text'
_BANK2XFELD[ 1: DOMALANGU =
$parameters.P_Language ].VALUE_TEXT
}
```

The following is the search definition above, with inapplicable fields removed (e.g. not the context-relevant fields that are flagged above).

```
@AbapCatalog.sqlViewName: 'ESH_U_BANK'
define view ESH_S_BANK_reduced
with parameters
P_Language: abap.lang
as select from ESH_N_BANK_BANK
{
banks,
bankl,
banka,
provz,
stras,
ort01,
swift,
bgrup,
bnklz,
pskto,
brnch,
_BANK2LAND1[ 1: DOMALANGU =
$parameters.P_Language ].VALUE_TEXT as VALUE_TEXT1,
_BANK2REGION[ 1: spras = $parameters.P_Language ].bezei,
_BankAdditionFields._BankCategory[ 1:Langu =
$parameters.P_Language].IntBankCateg,
_POST_BANK_ACCT[ 1: DOMALANGU = $parameters.P_Language
].VALUE_TEXT as VALUE_TEXT2
}
```

The following search definition is an example search definition (CDS-based search view) that is ready for search-definition criteria analysis, with the search-definition relevant fields highlighted (underlined):

```
@AbapCatalog.sqlViewName: 'ESH_L_BANK_BANK'
@AccessControl.authorizationCheck: #NOT_REQUIRED
@ObjectModel.usageType.serviceQuality: #P
@ClientHandling.algorithm: #SESSION_VARIABLE
@ClientHandling.type: #INHERITED
@AbapCatalog.compiler.compareFilter: true
@EndUserText.label: 'Bank master record'
define view ESH_N_BANK_BANK
as select from bnka
association [0..*] to ESH_N_LAND1_3_LAND1 as _BANK2LAND1
  on $projection.banks = _BANK2LAND1.DOMVALUE_L
association [0..*] to t005u as _BANK2REGION
  on $projection.banks = _BANK2REGION.land1 and
     $projection.provz = _BANK2REGION.bland
association [1..1] to ESH_N_USER_USER as _BANK2USER
  on $projection.ernam = _BANK2USER.bname
association [0..*] to ESH_N_XFELD_3_XFELD as _BANK2XFELD
  on $projection.loevm = _BANK2XFELD.domvalue_l
association [0..*] to ESH_N_XFELD_XFELD as _POST_BANK_ACCT
  on $projection.xpgro = _POST_BANK_ACCT.domvalue_l
association [0..1] to I_BankAdditionalFields as _BankAdditionFields
  on $projection.banks = _BankAdditionFields.BankCountry and
     $projection.bankl = _BankAdditionFields.BankInternalID
{
keybanks,
keybankl,
erdat,
concat(firsternam, lasternam) as ernam,
banka,
provz,
concat(street, housenr) as stras,
concat(cityprt1, cityprt2) as ort01,
swift,
bgrup,
xpgro,
loevm,
bnklz,
pskto,
admr,
brnch,
chkme,
concat(versprt1, versprt2) as vers,
_BANK2LAND1,
_BANK2REGION,
_BANK2USER,
_BANK2XFELD,
_POST_BANK_ACCT,
_BankAdditionFields
}
```

The following search definition is the example search definition (CDS-based search view) from above with the inapplicable elements removed (the unflagged elements):

```
@AbapCatalog.sqlViewName: 'ESH_L_BANK_BANK'
define view ESH_N_BANK_BANK_reduced
as select from bnka
association [0..*] to ESH_N_LAND1_3_LAND1 as _BANK2LAND1
  on $projection.banks = _BANK2LAND1.DOMVALUE_L
association [0..*] to t005u as _BANK2REGION
  on $projection.banks = _BANK2REGION.land1 and
     $projection.provz = _BANK2REGION.bland
association [1..1] to ESH_N_USER_USER as _BANK2USER
  on $projection.ernam = _BANK2USER.bname
association [0..*] to ESH_N_XFELD_3_XFELD as _BANK2XFELD
  on $projection.loevm = _BANK2XFELD.domvalue_l
association [0..*] to ESH_N_XFELD_XFELD as _POST_BANK_ACCT
  on $projection.xpgro = _POST_BANK_ACCT.domvalue_l
association [0..1] to I_BankAdditionalFields as _BankAdditionFields
  on $projection.banks = _BankAdditionFields.BankCountry and
     $projection.bankl = _BankAdditionFields.BankInternalID
{
key banks,
key bankl,
banka,
provz,
concat(street, housenr) as stras,
concat(cityprt1, cityprt2) as ort01,
swift,
bgrup,
```

```
bnklz,
pskto,
brnch,
_BANK2LAND1,
_BANK2REGION,
_BANK2USER,
_BANK2XFELD,
_POST_BANK_ACCT,
_BankAdditionFields
}
```

The following search definition is the search definition (CDS-based Search View) from above, with the cruxes highlighted (underlined):

```
@AbapCatalog.sqlViewName: 'ESH_L_BANK_BANK'
define view ESH_N_BANK_BANK_reduced
as select from bnka
association [0..*] to ESH_N_LAND1_3_LAND1 as _BANK2LAND1
  on $projection.banks = _BANK2LAND1.DOMVALUE_L
association [0..*] to t005u as _BANK2REGION
  on $projection.banks = _BANK2REGION.land1 and
  $projection.provz = _BANK2REGION.bland
association [1..1] to ESH_N_USER_USER as _BANK2USER
  on $projection.ernam = _BANK2USER.bname
association [0..*] to ESH_N_XFELD_3_XFELD as _BANK2XFELD
  on $projection.loevm = _BANK2XFELD.domvalue_l
association [0..*] to ESH_N_XFELD_XFELD as _POST_BANK_ACCT
  on $projection.xpgro = _POST_BANK_ACCT.domvalue_l
association [0..1] to I_BankAdditionalFields as _BankAdditionFields
  on $projection.banks = _BankAdditionFields.BankCountry and
  $projection.bankl = _BankAdditionFields.BankInternalID
{
key banks,
key bankl,
banka,
provz,
concat(street, housenr) as stras,
concat(cityprt1, cityprt2) as ort01,
swift,
bgrup,
bnklz,
pskto,
brnch,
_BANK2LAND1,
_BANK2REGION,
_BANK2USER,
_BANK2XFELD,
_POST_BANK_ACCT,
_BankAdditionFields
}
```

Example 14—Crux Detection Module Environments

Figure 5A:
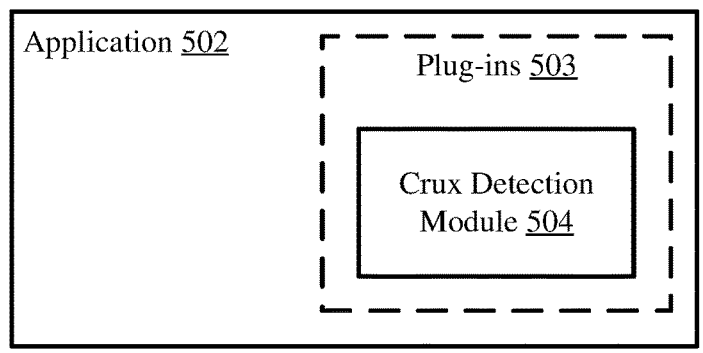
FIG. 5A is an exemplary application environment for a crux detection module.

FIG. 5A is a schematic diagram depicting an application environment for a crux detection module 504, which may provide implementation crux detection functionality, as described herein. An application 502, such as a software application running in a computing environment, may have one or more plug-ins 503 (or add-ins or other software extensions to programs) that add functionality to, or otherwise enhance, the application. The crux detection module 504 may be integrated with the application 502; for example, the crux detection module may be integrated as a plug-in. The crux detection module 504 may add functionality to the application 502 for implementation crux detection functionality, which may be displayed in a user interface or otherwise provided to a user. For example, the application 502 may be a database, a database management application, or an integrated development environment, and the crux detection module 504 may be integrated with the database, data management application, or integrated development environment to provide implementation crux detection functionality.

Figure 5B:
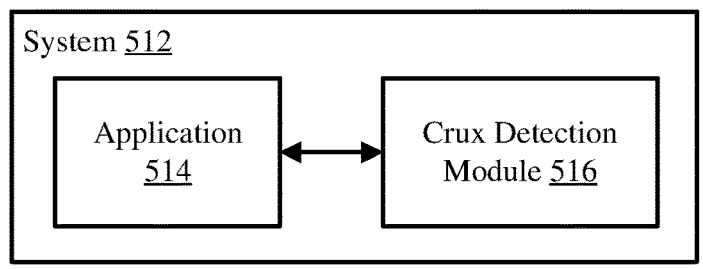
FIG. 5B is an exemplary system environment for a crux detection module.

FIG. 5B is a schematic diagram depicting a system environment for a crux detection module 516, which may provide implementation crux detection functionality, as described herein. The crux detection module 516 may be integrated with a computer system 512. The computer system 512 may include an operating system, or otherwise be a software platform, and the crux detection module 516 may be an application or service running in the operating system or platform, or the crux detection module may be integrated within the operating system or platform as a service or functionality provided through the operating system or platform. The system 512 may be a server or other networked computer or file system. Additionally or alternatively, the crux detection module 516 may communicate with and provide implementation crux detection functionality, as described herein, to one or more applications 514, such as a database, database management applications, or integrated development environment, in the system 512.

Figure 5C:
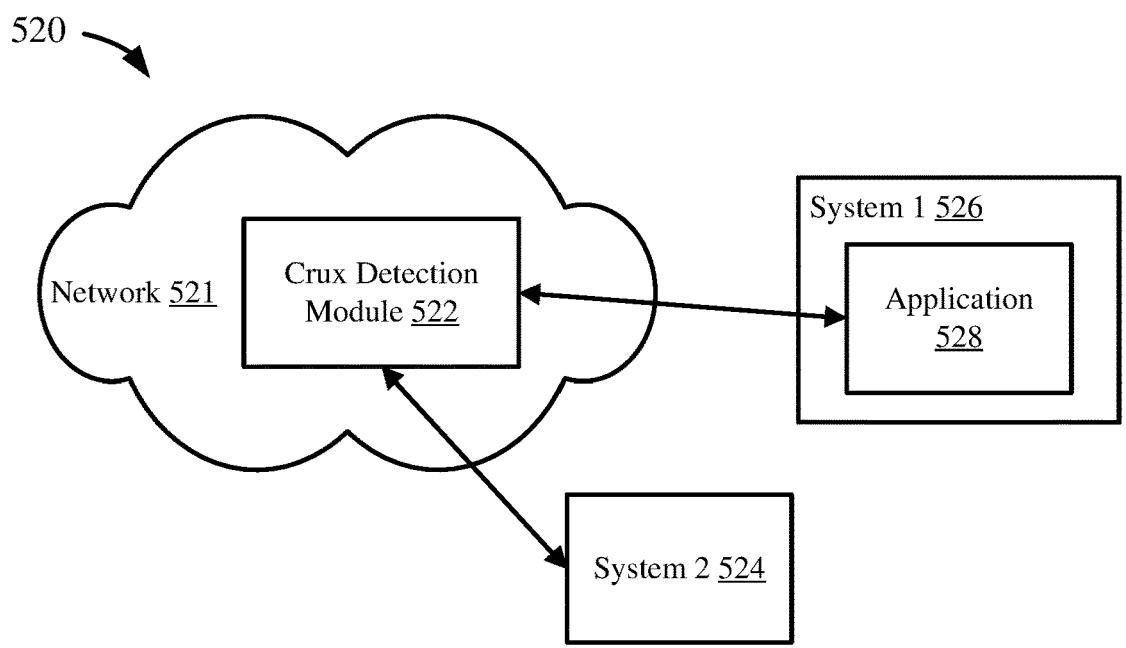
FIG. 5C is an exemplary network environment for a crux detection module.

FIG. 5C is a schematic diagram depicting a network environment 520 for a crux detection module 522, which may provide implementation crux detection functionality, as described herein. The crux detection module 522 may be available on a network 521, or integrated with a system (such as from FIG. 5B) on a network. Such a network 521 may be a cloud network or a local network. The crux detection module 522 may be available as a service to other systems on the network 521 or that have access to the network (e.g., may be on-demand software or SaaS). For example, system 2 524 may be part of, or have access to, the network 521, and so can utilize implementation crux detection functionality from the crux detection module 522. Additionally, system 1 526, which may be part of or have access to the network 521, may have one or more applications, such as application 528, that may utilize implementation crux detection functionality from the crux detection module 522.

In these ways, the crux detection module 504, 516, 522 may be integrated into an application, a system, or a network, to provide implementation crux detection functionality, or other code or definition analysis functionality, as described herein.

Example 15—Computing Systems

Figure 6:
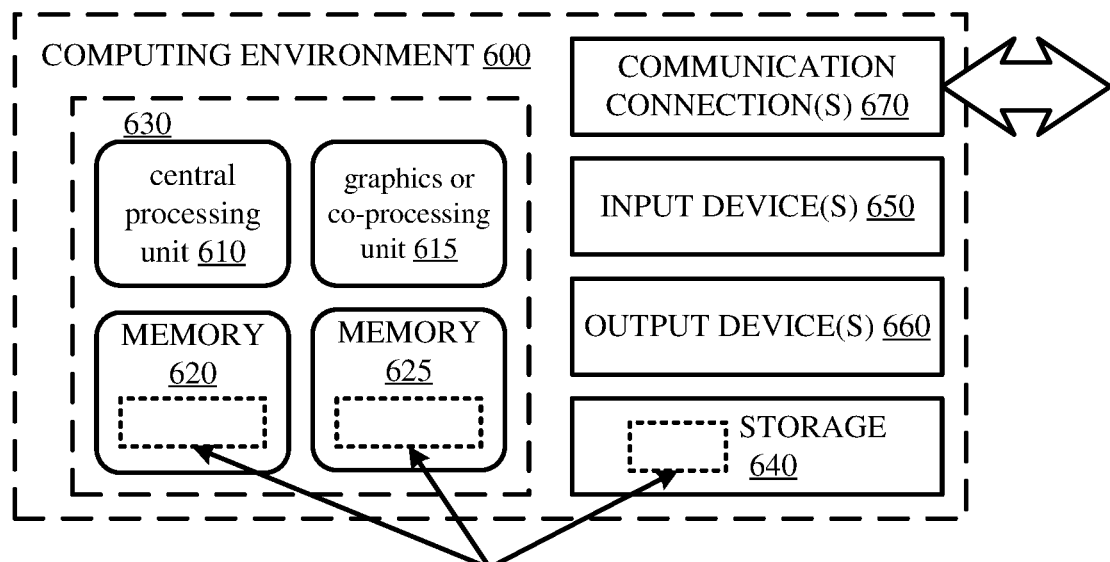
FIG. 6 is a diagram of an example computing system in which described embodiments can be implemented.

FIG. 6 depicts a generalized example of a suitable computing system 600 in which the described innovations may be implemented. The computing system 600 is not intended to suggest any limitation as to scope of use or functionality of the present disclosure, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions, such as for implementing components of the processes of FIG. 3, the systems of FIGS. 1 and 5A-C, or the data, data representations, or data structures of FIG. 2, and the examples of FIGS. 4A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s) 610, 615. The memory 620, 625 stores software 680 implementing one or more innovations described herein, in the form of computer-executable instructions suitable for execution by the processing unit(s) 610, 615. The memory 620, 625, may also store settings or settings characteristics, databases, data sets, search definitions or representations, or examples shown in FIGS. 2 and 4A-C, the systems shown in FIGS. 1 and 5A-C, or the steps of the processes shown in FIG. 3.

A computing system 600 may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 16—Cloud Computing Environment

Figure 7:
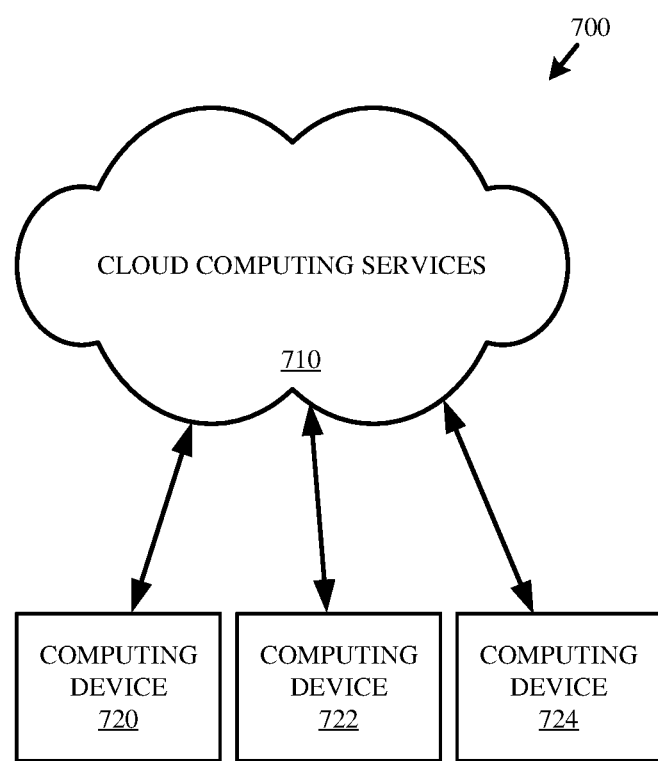
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operations (e.g., data processing, data storage, and the like).

Example 17—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware).

Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Example 18—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method comprising:
generating a dependency graph for a database search definition set, wherein the database search definition set comprises database search definitions written in a database language, wherein the dependency graph comprises nodes representing database search definitions of the database search definition set, and wherein the dependency graph indicates dependency between database search definitions in the database search definition set;
reducing the dependency graph for a given database search definition, wherein the reducing removes database search definitions on which the given database search definition does not depend, wherein the given database search definition is a root of a tree within the dependency graph, and generating a first search view in which the removed database definitions are omitted;
removing elements in the given database search definition of the reduced dependency graph based on context criteria, wherein the context criteria identifies relevant elements and irrelevant elements are removed;
removing elements in the remaining database search definitions of the reduced dependency graph based on search definition criteria, wherein the search definition criteria identifies relevant elements and irrelevant elements are removed, and generating a second search view of the relevant elements;
identifying one or more implementation crux elements in the database search definitions of the reduced dependency graph, and generating a third search view of the relevant elements in which the identified implementation crux elements are flagged;
using a code analyzer to analyze the identified implementation crux elements;
generating suggested changes to the identified implementation crux elements based on output from the code analyzer; and
identifying one or more of the suggested changes to the identified implementation crux elements to improve performance of the database search definition set.

2. The method of claim 1, wherein the one or more implementation crux elements are performance-impacting elements.

3. The method of claim 1, wherein the context criteria is selected from the group consisting of part of the Enterprise Search Semantic Key, a Response Field, a Freestyle Request Field, a Facetted Search Request Field, an Advanced Search Field, an Auto Completion Field, a Language Code Field, and referenced by a Data Control Language document.

4. The method of claim 1, wherein the search definition criteria is selected from the group consisting of search definition criteria referenced by an element/field of a higher search definition, search definition criteria referenced by a WHERE condition of a higher search definition, search definition criteria referenced by a JOIN condition of a higher search definition and search definition criteria otherwise reference by a higher search definition.

5. The method of claim 1, further comprising:
updating one or more database search definitions determined to have at least one implementation crux element based on its associated implementation crux element.

6. One or more non-transitory computer-readable storage media storing computer-executable instructions for causing a computing system to perform a method, the method comprising:
receiving a request to identify implementation cruxes in a database search definition set, wherein the database search definition set comprises database search definitions written in a database language:
accessing a hierarchical representation of the database search definition set;
reducing the hierarchical representation based on an initial database search definition, wherein the reducing comprises removing search definitions unrelated to the initial database search definition based on the hierarchical representation;
focusing the reduced hierarchical representation, wherein the focusing comprises removing elements of the initial database search definition based on context criteria and removing elements of remaining database search definitions in the reduced hierarchical representation based on search definition criteria;
identifying one or more implementation cruxes in a search view listing the database search definitions of the reduced and focused hierarchical representation based on crux criteria;
providing the identified implementation cruxes;
using a code analyzer to analyze the identified implementation cruxes;
generating suggested changes to the identified implementation cruxes based on output from the code analyzer; and
providing one or more of the suggested changes for the identified implementation cruxes to a search developer via a user interface for approval to improve performance of the database search definition set.

7. The one or more non-transitory computer-readable storage media of claim 6, the method further comprising:
generating the hierarchical representation of the database search definition set based on dependencies between search definitions in the database search definition set.

8. The one or more non-transitory computer-readable storage media of claim 6, the method further comprising:
setting an indicator associated with the initial database search definition indicating at least one implementation crux was identified.

9. The one or more non-transitory computer-readable storage media of claim 6, wherein at least one of the identified implementation cruxes is a performance-impacting search definition element.

10. The one or more non-transitory computer-readable storage media of claim 6, wherein the suggested changes approved by the search developer are displayed on the user interface in an altered search definition set.

11. The one or more non-transitory computer-readable storage media of claim 6, wherein the hierarchical representation is a graph representation.

12. The one or more non-transitory computer-readable storage media of claim 6, wherein reducing the hierarchical representation comprises traversing the hierarchical representation and setting a remove indicator for database search definitions unrelated to the initial database search definition.

13. The one or more non-transitory computer-readable storage media of claim 6, wherein focusing the hierarchical representation comprises traversing the hierarchical representation and accessing the database search definitions based on references in the hierarchical representation.

14. A system comprising:
one or more memories;
one or more processing units coupled to the one or more memories; and
one or more computer-readable storage media storing instructions that, when loaded into the one or more memories, cause the one or more processing units to perform operations comprising:
receiving a request to identify implementation cruxes in a set of database queries of a database search definition set, wherein the database queries are written in a database language;
generating a hierarchical representation of the set of database queries, wherein the hierarchical representation indicates dependencies between database queries in the set of database queries;
accessing the hierarchical representation of the set of database queries;
identifying a starting database query in the set of database queries;
reducing the hierarchical representation, wherein the reducing comprises:
identifying one or more extra database queries unrelated to the starting database query within the set of database queries based on the hierarchical representation; and
removing the one or more identified extra database queries; focusing the reduced hierarchical representation, wherein the focusing comprises:
analyzing at least the starting database query in the reduced hierarchical representation to determine relevant elements in the starting database query based on context criteria, wherein the analyzing comprises setting a given relevance indicator associated with a given query element to indicate relevance as determined based on the context criteria, removing elements in at least the starting database query based on their respective associated context relevance indicators, wherein removed elements have associated indicators not indicating relevance, analyzing one or more database queries in the reduced hierarchical representation to determine relevant elements based on search definition criteria, wherein the analyzing comprises setting the given relevance indicator associated with the given query element to indicate relevance as determined based on the search definition criteria;
removing elements in the one or more database queries based on their respective associated relevance indicators, wherein removed elements have associated indicators not indicating relevance;
analyzing the database queries in the reduced and focused hierarchical representation to identify implementation cruxes in the database queries based on crux criteria;
generating a search view with a list of identified implementation cruxes;
providing the generated list of identified implementation cruxes;
using a code analyzer to analyze the identified implementation cruxes;

generating suggestions based on output from the code analyzer for changes to the identified implementation cruxes to improve performance and/or results of the set of database queries; and providing the suggestions together with the list of identified implementation cruxes.

\* \* \* \* \*